(12) United States Patent
Sakai et al.

(10) Patent No.: US 7,141,081 B2
(45) Date of Patent: Nov. 28, 2006

(54) SOLID ELECTROLYTIC CAPACITOR AND METHOD FOR PRODUCING THE SAME

(75) Inventors: Atsushi Sakai, Nagano (JP); Ryuji Monden, Nagano (JP); Hiroshi Nitoh, Nagano (JP); Toshihiro Okabe, Nagano (JP); Yuji Furuta, Nagano (JP); Hideki Ohata, Chiba (JP); Koro Shirane, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 11/311,397

(22) Filed: Dec. 20, 2005

(65) Prior Publication Data

US 2006/0098394 A1     May 11, 2006

Related U.S. Application Data

(62) Division of application No. 10/876,622, filed on Jun. 28, 2004, now Pat. No. 7,046,504, which is a division of application No. 09/576,957, filed on May 24, 2000, now Pat. No. 6,890,363.

(60) Provisional application No. 60/135,843, filed on May 24, 1999, provisional application No. 60/135,844, filed on May 24, 1999.

(30) Foreign Application Priority Data

Feb. 17, 2000   (JP)   .............................. 2000-039185

(51) Int. Cl.
    *H01G 9/00* (2006.01)
(52) U.S. Cl. ..................................... 29/25.03; 29/25.02
(58) Field of Classification Search .... 29/25.02–25.03; 361/502–541
    See application file for complete search history.

(56) References Cited

U.S. PATENT DOCUMENTS

| 4,296,458 | A | * | 10/1981 | Smith et al. ................. 361/518 |
| 4,499,520 | A |   | 2/1985  | Cichanowski |
| 4,872,962 | A |   | 10/1989 | Scheer et al. |
| 5,117,332 | A |   | 5/1992  | Kudoh et al. |
| 5,198,967 | A |   | 3/1993  | Kuranuki et al. |
| 5,412,533 | A |   | 5/1995  | Murayama et al. |
| 5,483,415 | A |   | 1/1996  | Nakamura et al. |
| 5,693,104 | A |   | 12/1997 | Kuriyama |
| 5,699,597 | A |   | 12/1997 | Nakamura et al. |

(Continued)

FOREIGN PATENT DOCUMENTS

JP            3-95910         4/1991

(Continued)

OTHER PUBLICATIONS

Computer English Translation of Kenichi JP 05-047611, Publication date Feb. 26, 1993, 6 pages.

*Primary Examiner*—H. Jey Tsai
(74) *Attorney, Agent, or Firm*—Sughrue Mion, PLLC

(57) ABSTRACT

The present invention relates to a solid electrolytic capacitor having a masking structure in which the insulation between the anode part and the cathode part can be ensured without fail, to its production method, to a method for coating a masking agent on a solid electrolytic capacitor substrate, and to apparatus therefore. According to the present invention, the masking material covers the dielectric film on the metal material having valve action and sufficiently infiltrates into the core metal made of a metal having valve action while the solid electrolyte is masked by the masking material without fail, so that a solid electrolytic capacitor can be produced that has a reduced leakage current and a reduced stress generated at the reflow treatment or the like.

2 Claims, 5 Drawing Sheets

U.S. PATENT DOCUMENTS 5,795,647 A    8/1998    Robinson et al.
6,288,890 B1   9/2001    Saito et al.

FOREIGN PATENT DOCUMENTS

| | | |
|---|---|---|
| JP | 4-243116 | 8/1992 |
| JP | 5-47611 | 2/1993 |
| JP | 5-166681 | 7/1993 |
| JP | 9-036003 | 2/1997 |
| JP | 11-80596 | 3/1999 |

* cited by examiner

▨ The portion where S was detected $V1 > V2$ $V1 < V2$

SOLID ELECTROLYTIC CAPACITOR AND METHOD FOR PRODUCING THE SAME

CROSS-REFERENCE TO RELATED APPLICATIONS

This application is a Divisional of application Ser. No. 10/876,622 filed Jun. 28, 2004 now U.S. Pat. No. 7,046,504, which is a Divisional of application Ser. No. 09/576,957 filed May 24, 2000, now U.S. Pat. No. 6,890,363, which claims benefit of U.S. Provisional Application Nos. 60/135,843 and 60/135,844 filed on May 24, 1999; the disclosures of which are incorporated herein by reference in their entirety.

TECHNICAL FIELD

The present invention relates to a solid electrolytic capacitor and to its production method. More specifically, the present invention relates to a solid electrolytic capacitor having a masking structure that in forming a solid electrolyte layer on a valve-acting metal substrate having thereon a dielectric film, in which a portion of metal substrate where the solid electrolyte layer is not provided (anode part) can be insulated without fail from the solid electrolyte layer or an electrically conducting layer formed on the solid electrolyte layer using an electrically conducting paste or the like (cathode part) and to its production method. Also, the present invention relates to a method and apparatus for coating a masking agent on the substrate of a solid electrolytic capacitor.

BACKGROUND ART

A solid electrolytic capacitor using an electrically conducting polymer has a basic structure such that an oxide dielectric film is formed on the surface of a valve-acting metal such as aluminum, tantalum or titanium, previously subjected to etching treatment, an electrically conducting polymer which works out to solid electrolyte is formed on the oxide dielectric film, an anode lead is connected to the anode terminal (the metal surface area where the solid electrolyte is not formed) and a cathode lead is connected to the electrically conducting layer containing the electrically conducting polymer. The solid electrolytic capacitor is manufactured by finally sealing the device as a whole with insulating resins such as epoxy resins.

Such solid electrolytes using an electrically conducting polymer for the solid electrolyte can be reduced in the equivalent series resistance and the leakage current as compared with solid electrolytic capacitors using manganese dioxide or the like for the solid electrolyte. This is advantageous in manufacturing a capacitor capable of coping with the tendency of electronic equipment toward higher performance and smaller size. Accordingly, a large number of production methods have been proposed therefor.

In order to produce a high-performance solid electrolytic capacitor using an electrically conducting polymer, it is indispensable to secure electrical insulation of the anode part which works out to an anode terminal, from the cathode part comprising an electrically conducting layer containing an electrically conducting polymer.

As the masking means for insulating the anode part from the cathode part of a solid electrolytic capacitor, for example, a method of coating, printing or potting epoxy resins, phenol resins or the like on an unformed area and curing the resin to prevent passing of electricity (see, JP-A-3-95910 (the term "JP-A" as used herein means an "unexamined published Japanese patent application")), a method of electrodepositing a solution containing a polyamic salt on at least a part of the valve-acting metal in the area where the solid electrolyte is not formed, thereby forming a polyamic acid film, and dehydration-curing the film by heating to form a polyimide film (see, JP-A-5-47611), a method of forming a tape or resin coating film part made of polypropylene, polyester, silicon or fluorine-based resin so as to prevent the solid electrolyte from climbing up (see, JP-A-5-166681), and a method of forming an insulating resin layer on the surface of a metal substrate in the boundary part between the area which works out to an anode terminal and the area where the capacitor is formed, and removing the insulating resin layer in the area other than the capacitor part to expose the metal substrate (see, JP-A-9-36003).

The method of using phenol resins or epoxy resins as the masking material (JP-A-3-95910) is disadvantageous in that the capacitor is greatly damaged when pressed by external force, because the elastic modulus of resin is high and the stress against strains is high.

The method of forming a polyimide film by electrodeposition (JP-A-5-47611) may successfully form a film even inside the pore parts as compared with ordinary coating methods, however, the production cost increases because of necessity of the electrodeposition step and moreover, a dehydration step at a high temperature is necessary so as to form the polyimide film.

The method of forming an insulating resin-made tape or resin coating film part so as to prevent the solid electrolyte from climbing up at the manufacturing (JP-A-5-166681) has difficulty in firmly fixing the tape (film) at edge parts of the substrate and bears a risk of polymer solid electrolyte as the solid electrolyte invading the anode side.

The method of forming an insulating resin layer-and-then removing the insulating resin layer in the area other than the capacitor part to expose the metal substrate (JP-A-9-36003) includes a substantially useless step of once forming an insulating resin layer and then removing it.

As described above, the conventional masking means are insufficient and actually it has not been clear yet what is like the form (structure) of a masking that can insulate without fail the anode part from the cathode part of a solid electrolytic capacitor.

OBJECT OF THE INVENTION

Accordingly, an object of the present invention is to provide a solid electrolytic capacitor having a masking structure that in forming a solid electrolyte layer on a valve-acting metal substrate having thereon a dielectric film, in which a portion of metal substrate where the solid electrolyte layer is not provided (anode part) can be insulated without fail from the solid electrolyte layer or an electrically conducting layer formed on the solid electrolyte layer using an electrically conducting paste or the like (cathode part) and an its production method.

Another object of the present invention is to provide a method for coating a masking agent that can efficiently perform masking capable of insulating without fail the anode part from the cathode part of a solid electrolytic capacitor and an apparatus therefor.

SUMMARY OF THE INVENTION

The present inventors have made extensive investigations on the following matters: (1) to use as a material for forming a masking material (hereinafter referred to as a masking material coating solution), for example, a solution containing a heat resistant resin or a precursor thereof, or a solution containing a low molecular weight polyimide having good insulating property and exhibiting high heat resistance after the curing or a precursor thereof; (2) to apply electrochemical forming to the cut out parts after the cutting of a metal material because in the case of conventional metal formed material foils, the cut out parts generated on the cutting into a desired dimension remain unformed and give rise to an increase in the leakage current; and (3) to use as the solid electrolyte an electrically conducting polymer containing as a repeating unit a divalent group of any one of pyrrole, thiophene, aniline and furan or any substituted derivative thereof. As a result, it has been found that a masking structure can be formed in which the masking material is attached on the dielectric film sufficiently and infiltrated into the dielectric film to the core metal. The present invention has been accomplished based on this finding.

Also, the present inventors have made extensive investigations on the matter that upon electrochemical formation treatment, the electrochemical formation liquid infiltrates into the substrate to increase the leakage current at the time of electrochemical formation so that short circuit to the electrode occurs. As a result, it has been confirmed that dividing the masking step into two stages and applying a temporary masking (first masking layer), performing electrochemical formation treatment based on the position of the temporary masking and applying main masking (second masking layer) on different portions of the substrate so that necessary portions (portions except for the anode part of the solid electrolytic capacitor) can be formed without fail and easily, causing no infiltration of the electrochemical formation liquid across the temporary masking layer.

Further, the present inventors conducted studies in an attempt to discover a method for applying a heat resistant resin having good insulating property and heat resistance, such as polyimide, as a masking material to an etched valve-acting metal substrate and having a metal oxide layer formed on the surface, at a desired position (around an entire circumference).

The present inventors examined the following methods:

(1) A masking agent in the form of a fine string is hung down directly onto the surface of a substrate (formed aluminum foil) by means of, for example, a dispenser;

(2) A masking agent is applied to the surface of formed aluminum foil by means of, for example, a brush or a slender bar such as a bamboo skewer; and (3) A masking agent is applied to the surface of formed aluminum foil through screen printing.

Methods (1) and (2) can apply the masking agent within a short period of time, but involve difficulty in maintaining stable work over a long period of time, because of partial solidification on, for example, a bamboo skewer. Further, since the surface of a typical porous formed aluminum foil repels the masking agent, linear application of the masking agent is difficult, and thus the applied masking agent tends to become nonuniform. The screen printing method described in (3) can uniformly apply the masking agent to the foil surface, but involves difficulty in applying the masking agent to a predetermined thickness (about 10–30 μm/one surface) and in applying the masking agent reliably to side surfaces of the formed foil.

As described above, any one of the above methods involve difficulty in applying a masking agent uniformly and linearly around an entire circumference of a substrate.

Next, in terms of efficient application of a masking agent to a number of substrates (formed aluminum foils), the present inventors have found promising a method in which a plurality of substrates are connected to a guide plate in a cantilever fashion, and a masking agent is applied to each of the substrates at a predetermined position and around an entire circumference thereof. Thus, the present inventors trial-manufactured, for study, an apparatus including: a device for moving a metallic guide to which the substrates are fixedly attached; a rotating disk having a circumferential surface which serves as a coating surface; a bath which contains a masking agent and allows the rotating disk to be partially immersed in the masking agent; and a scraper for scraping off residual material from the rotating disk. The circumferential surface, to which the masking agent adheres, is brought into contact with the lower surface of the formed aluminum foil connected to the metallic guide plate, thereby applying the masking agent.

However, the trial-manufactured apparatus involves the following problems. Since a solution which contains a masking material is contained in an open system (exposed to the air) during coating, the masking material is solidified in the vicinity of the scraper. Also, the viscosity of the masking agent contained in the bath varies, causing instability in coating. Thus, the solution which contains the masking material must be replaced at short intervals.

The present inventors have been successful in applying a masking agent uniformly and linearly around an entire circumference of a substrate through employment of the following measures.

(1) A plurality of formed foils (substrates) are fixedly attached, in a cantilever fashion, to a base (metallic guide) which moves linearly.

(2) A rotating disk is disposed such that the top of a smooth circumferential surface (coating surface) abuts, at a constant force, the back surface (lower surface) of the substrate, which is fixedly attached to the metallic guide.

(3) A solution which contains a masking material is stored in a closed container, and the masking agent is fed to the coating surface of the rotating disk through a closed system; specifically, through, for example, a resin tube or needle by use of a quantity coating-fluid feeder, such as a continuous quantity dispenser of little pulsation.

(4) The rotating disk, whose circumferential surface serves as the coating surface and is uniformly coated with the solution which contains the masking material, is pressed against the formed foil, thereby applying the masking material to the lower surface and side surfaces of the formed foil substrate through adjustment of the traveling speed of the metallic guide plate and the rotational speed of the rotating disk.

(5) There is provided means for cleaning off the remaining masking material from a portion of the coating surface located downstream of the position where the rotating disk comes into contact with the formed foil substrate and upstream of the position where the rotating disk is coated with fresh coating solution.

That is, the present invention provides a method for producing a solid electrolytic capacitor, a solid electrolytic capacitor produced by the method, a method for coating a masking material solution and an apparatus therefor as described below.

[1] A method for producing a solid electrolytic capacitor comprising a metal material having thereon a dielectric film and a solid electrolyte formed on a desired position of the dielectric film, the metal material having valve action, wherein the method comprises the step of coating a masking material solution that infiltrates into the dielectric film and forms a masking layer on the infiltrated portion.

[2] A method for producing a solid electrolytic capacitor comprising a metal material having thereon a dielectric film and a solid electrolyte formed on a desired position of the dielectric film, the metal material having valve action, wherein the method comprises the step of coating a masking material solution that infiltrates into the dielectric film and forms a masking layer on the infiltrated portion, wherein a masking resin that has infiltrated into the dielectric film and solidified during the coating step prevents infiltration of a solid electrolyte formed in a subsequent step.

[3] The method for producing a solid electrolytic capacitor as described in [2] above, wherein the concentration of the solid electrolyte in the dielectric film where the masking resin has infiltrated in the step of coating a masking material solution is not higher than a detection limit value attained by use of an electron probe microanalyser.

[4] The method for producing a solid electrolytic capacitor as described in any one of [1]to [3] above, wherein a plurality of solid electrolytic capacitor substrates are fixedly attached to a metallic guide in a cantilever fashion, and a rotating disk is brought into contact with the substrates at a desired position at a predetermined pressing force while the metallic guide is moved, thereby coating a masking material solution, which is fed from masking-material-solution supply means to the coating surface of the rotating disk, on opposite surfaces and opposite side surfaces of the solid electrolytic capacitor substrate at a desired position to form the masking layer.

[5] The method for producing a solid electrolytic capacitor as described in [4] above, wherein the relative position between the metallic guide and the rotating disk is inverted to thereby apply the masking material solution to opposite surfaces and opposite side surfaces of the substrate fixedly attached to the metallic guide.

[6] A method for producing a solid electrolytic capacitor comprising a metal material having thereon a dielectric film and a solid electrolyte formed on a desired position of the dielectric film, said metal material being cut into a predetermined shape and having valve action, as described in [1] above wherein the method comprises the step of coating a masking material solution on said metal material to form a first masking layer and the step of coating a masking material solution on said metal material to form a second masking layer, wherein at least the step of forming a second masking layer causes the infiltration of the masking material solution into the dielectric film and the formation of the masking layer on the infiltrated portion.

[7] A method for producing a solid electrolytic capacitor comprising a metal material having thereon a dielectric film and a solid electrolyte formed on a desired position of the dielectric film, said metal material being cut into a predetermined shape and having valve action, wherein the method comprises:

a step of linearly coating a masking material solution around the entire circumference in the region undertaking the boundary in the application of electrochemical forming onto said metal material, and heating the solution to form a first masking layer;

a step of subjecting an area where a solid electrolyte is formed later to electrochemical forming, the area being defined by the first masking layer on said metal material;

a step of further linearly coating a masking material solution around the entire circumference in the region at a predetermined distance from said first masking layer on said electrochemically formed metal material, and heating the solution to form a second masking layer;

a step of forming a solid electrolyte in the area exclusive of the space between said first masking layer and said second masking layer out of the area subjected to said electrochemical forming; and a step of cutting said metal material in the space between said first masking layer and said second masking layer.

[8] The method for producing a solid electrolytic capacitor as described in any one of [1] to [7] above, wherein a solution of a heat resistant resin or a precursor thereof is used as the masking material solution.

[9] The method for producing a solid electrolytic capacitor as described in [8] above, wherein the solution of a heat resistant resin or a precursor thereof is a low molecular weight polyimide solution or polyamic acid solution capable of being solidified by heating.

[10] The method for producing a solid electrolytic capacitor as described in [8] or [9] above, wherein the masking material solution further contains silicone oil, silane coupling agent or polyimidesiloxane.

[11] The method for producing a solid electrolytic capacitor as described in any one of [1] to [7] above, wherein the metal foil material having valve action is a metal material selected from the group consisting of aluminum, tantalum, niobium, titanium, zirconium, and an alloy thereof.

[12] The method for producing a solid electrolytic capacitor as described in any one of [1] to [7] above, wherein the solid electrolyte is a polymer solid electrolyte containing as a repeating unit at least one of a divalent group of any one of pyrrole, thiophene, aniline and furan or any substituted derivative thereof.

[13] The method for producing a solid electrolytic capacitor as described in [12] above, wherein the solid electrolyte contains a polymer of 3,4-ethylenedioxythiophene.

[14] The method for producing a solid electrolytic capacitor as described in [12] or [13], wherein the polymer solid electrolyte further contains a dopant of an arylsulfonic salt.

[15] A solid electrolytic capacitor comprising a metal material having thereon a dielectric film and a solid electrolyte formed on a desired position of the dielectric film, the metal material having valve action, wherein said solid electrolytic capacitor comprises a structure in which a masking material solution has infiltrated into said dielectric film and forms a masking layer on the infiltrated portion of the dielectric film, so that the solid electrolyte is prevented from infiltrating into the dielectric film where the masking material solution has infiltrated and masked by the masking layer formed on the infiltrated portion.

[16] The solid electrolytic capacitor as described in [15] above, wherein the masking layer is formed using a masking material solution of a heat resistant resin or precursor thereof.

[17] The solid electrolytic capacitor as described in [15] above, wherein the concentration of the solid electrolyte in the dielectric film where the masking material solution has infiltrated is not higher than a detection limit value attained by use of an electron probe microanalyzer.

[18] A method for coating a masking agent, comprising the steps of fixedly attaching a plurality of solid electrolytic capacitor substrates to a metallic guide in a cantilever fashion, and bringing a rotating disk into contact with the substrates at a desired position at a predetermined pressing force while the metallic guide is moved, thereby coating a masking material solution, which is fed from masking material solution supply means to the coating surface of the rotating disk, to opposite surfaces and opposite side surfaces of the solid electrolytic capacitor substrate at a desired position.

[19] The method for coating a masking agent as described in [18] above, wherein the relative position between the metallic guide and the rotating disk is inverted to thereby apply the masking material solution to opposite surfaces and opposite side surfaces of the substrate fixedly attached to the metallic guide.

[20] An apparatus for coating a masking agent to opposite surfaces and opposite side surfaces of the solid electrolytic capacitor substrate (12) at a desired position, comprising a metallic guide (11) to which a plurality of solid electrolytic capacitor substrates (12) are fixedly attached in a cantilever fashion; means for moving said metallic guide; a rotating disk (13) which comes into contact with the substrates (12) at a desired position at a predetermined pressing force; means (14) for feeding to the coating surface of said rotating disk (13) a solution which contains the masking material; and a scraper (15) for cleaning the coating surface of said rotating-disk (13).

[21] The apparatus for coating a masking agent as described in [20] above, wherein the relative position between the metallic guide and the rotating disk is inverted to thereby apply the masking material solution to opposite surfaces and opposite side surfaces of the substrate fixedly attached to the metallic guide.

[22] The apparatus for coating a masking agent as described in [20] above, wherein two rotating disks are employed, and either one of the two rotating disks is dedicated to coating the masking material solution to reversal surfaces of the substrates fixedly attached to the inverted metallic guide.

[23] The apparatus for coating a masking agent as described in [20] above, wherein two rotating disks are disposed on opposite sides with respect to the substrates fixedly attached to the metallic guide, thereby coating the masking material solution concurrently to opposite surfaces and opposite side surfaces of the substrate.

[24] The apparatus for coating a masking agent as described in any one of [20] to [23] above, wherein the substrate is formed of a valve-acting metal, and the coating surface of the rotating disk comes into contact with the substrates at a pressing force which does not exceed the elastic limit of the substrate.

[25] The apparatus for coating a masking agent as described in any one of [20] to [23] above, wherein the rotating disk is formed of a steel material or ceramic material.

[26] The apparatus for coating a masking agent as described in any one of [20] to [25], wherein the scraper is in the form of a blade which makes line contact with the coating surface of the rotating disk and which is formed of a resin or a steel softer than the material of the rotating disk.

[27] The apparatus for coating a masking agent as described in any one of [20] to [26], wherein a wiping material (16) comprising resin fiber soaked with an organic solvent and/or water is disposed in front of the scraper.

[28] The apparatus for coating a masking agent as described in any one of [20] to [27], wherein means (14) for feeding the masking agent comprises a continuous quantity dispenser and a tubular member.

FIGS. 1A to 1D show the outline of the production steps of a solid electrolytic capacitor according to the present invention and FIG. 2 is a schematic diagram illustrating the structure of the masking layer of the resulting solid electrolytic capacitor.

FIG. 1A is a plan view of a metal material (1) having thereon a porous oxide film, which is cut into a predetermined size and works out to a substrate of a solid electrolytic capacitor. FIG. 1B is a plan view showing the state where the first masking layer (2) is applied. FIG. 1C is a plan view showing the state where a electrochemically formed layer (3) is provided so as to form a porous oxide film without fail on the cut end parts produced accompanying the cutting. FIG. 1D is a plan view showing the state where a second masking layer (4) is applied.

FIG. 2 shows the structure of the masking portion along the cross section A–A' at FIG. 1D in an enlarged scale. As shown in FIG. 2, in the present invention, the masking layer (2) enters into the dielectric film (1b) and also is formed on the infiltrated portion while the solid electrolyte which infiltrates into the dielectric film (1b) cannot infiltrate into the dielectric film into which the masking material has already infiltrated and has a structure completely masked by the masking layer formed on the infiltrated layer.

In practical solid electrolytic capacitor device (9) as seen in FIG. 3, a lead wire (6) is connected to the anode terminal (5) assumed by the cutting plane, a lead wire (7) is connected to the cathode assumed by the solid electrolyte layer (4) or an electrically conducting layer (not shown) formed thereon using an electrically conducting paste or the like, and the whole is moulded with an insulating resin (8) such as epoxy resins, thereby completing the solid electrolytic capacitor.

When the masking process is practiced twice, the solid electrolytic capacitor can be produced by the process shown in FIGS. 4A to 4F.

FIG. 4A is a plan view of a metal material (1) having thereon a porous oxide film, which is cut into a predetermined size and works out to a substrate of a solid electrolytic capacitor. FIG. 4B is a plan view showing the state where the first masking layer (2a) is applied. FIG. 4C is a plan view showing the state where a electrochemically formed layer (3) is provided so as to form a porous oxide film without fail on the cut end parts produced accompanying the cutting. FIG. 4D is a plan view showing the state where a second masking layer (2b) is applied. FIG. 4E is a plan view showing the state where the solid electrolyte (4) is formed. FIG. 4F is a plan view of a solid electrolytic capacitor device (9) obtained by cutting between the first masking layer (2a) and the second masking layer (2b).

DETAILED DESCRIPTION OF THE INVENTION

Figure 1A:
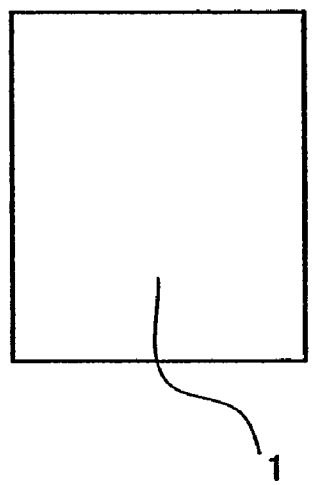
FIGS. 1A to 1D each is a view showing the outline of the production process of a solid electrolytic capacitor according to the present invention.
Figure 1B:
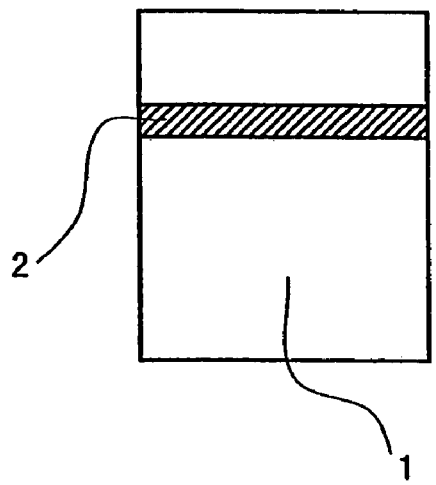
Figure 1C:
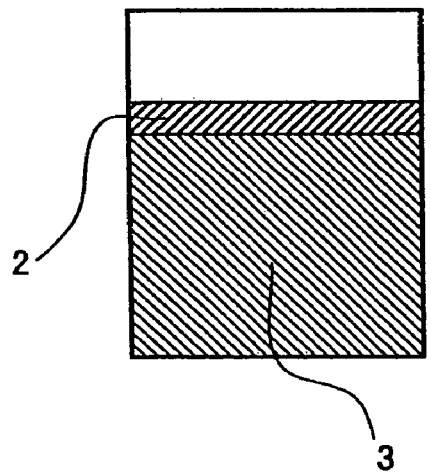

The present invention will be described in detail below.

(Valve-Acting Metal)

The substrate of the solid electrolytic capacitor is a valve-acting metal having on the surface thereof an oxide dielectric film. The valve-acting metal is selected from aluminum, tantalum, niobium, titanium and zirconium or a valve-acting metal foil or bar of an alloy system comprising these metals as a substrate or sintered body mainly comprising these metals. The metal has a dielectric film on the surface thereof due to oxidation by oxygen in air. However, in order to ensure the formation of dielectric oxide film, the metal is preferably subjected to etching or the like in advance by a known method to roughen the surface and then electrochemically formed in a usual manner. The valve-acting metal is preferably an aluminum foil having thereon an aluminum oxide layer.

The valve-acting metal after the surface roughening treatment is preferably cut into a size agreeing with the shape of the solid electrolytic capacitor, before use.

The thickness of the valve-acting metal foil varies depending on the use purpose, however, it is generally from about 40 to about 150 μm. The size and the shape of the valve-acting metal foil also Vary depending on the use, however, the metal foil as a plate-form device unit preferably has a rectangular shape having a width of from about 1 to about 50 mm and a length of about 1 to about 50 mm, more preferably having a width of about 2 to about 20 mm and a length of about 2 to about 20 mm, and most preferably having a width of about 2 to about 5 mm and a length of about 2 to about 6 mm.

(Electrochemical Forming)

The valve-acting metal cut into a predetermined shape is electrochemically formed by various methods. By previously performing electrochemical forming, increase of the leakage current can be prevented even if defects are generated in the masking layer.

The conditions for electrochemical forming are not particularly limited. For example, the electrochemical forming is performed using an electrolytic solution containing at least one of oxalic acid, adipic acid, boric acid, phosphoric acid and the like under the conditions such that the concentration of electrolytic solution is from 0.05 to 20 wt %, the temperature is from 0 to 90° C., the current density is from 0.1 to 200 mA/cm$^2$, the voltage is a numerical value selected according to the electrochemical forming voltage of a film already present on the formed foil to be treated, and the electrochemical forming time is 60 minutes or less. More preferably, the conditions are selected in the range such that the concentration of electrolytic solution is from 0.1 to 15 wt %, the temperature is from 20 to 70° C., the current density is from 1 to 100 mA/cm$^2$ and the electrochemical forming time is 30 minutes or less.

The above-described conditions for electrochemical forming are suitably used in industry, however, as long as the oxide dielectric film already formed on the surface of the valve-acting metal material is not ruptured or deteriorated, various conditions such as kind of electrolytic solution, concentration of electrolytic solution, temperature, current density, electrochemical forming time and the like, may be freely selected.

If desired or needed, the metal material may be subjected before or after the electrochemical forming to a treatment such as dipping in phosphoric acid for improving the water resistance, heating or dipping in boiling water for strengthening the film.

(Masking Material)

The masking layer is provided so as to prevent the electrochemical forming solution from running out to the portion which works out to anode of a solid electrolytic capacitor and ensure insulation from a solid electrolyte (cathode portion) to be formed in the subsequent step.

Accordingly, for the masking material, a composition comprising commonly used heat-resistant resins, preferably heat-resistant resins or precursors thereof soluble or swellable in a solvent, and further containing inorganic fine particle and cellulose-based resins (see JP-A-11-80596) may be used, but the material is not limited. Specific examples thereof include polyphenylsulfones (PPS), polyethersulfones (PES), cyanic ester resins, fluororesins (e.g., tetrafluoroethylene, tetrafluoroethylene-perfluoroalkyl vinyl ether copolymers), low molecular weight polyimides and derivatives thereof. Among these, low molecular weight polyimides, polyethersulfones, fluororesins and precursors thereof are preferred.

When the masking step is performed twice, the first masking layer is provided so as to prevent the electrochemical forming solution from running out to the anode portion of the solid electrolytic capacitor. The material for the first masking material is not particularly limited but the above-described commonly used heat resistant resins can be used. For the second masking, the same material for the first masking material may be used. In particular, polyimides are preferred because of its sufficiently high adhesive strength to the valve-acting metal, good filling property, capability of withstanding a heat treatment up to about 450° C. and excellent insulating property.

Polyimides are conventionally used as a solution prepared by dissolving a polyamic acid as a precursor in a solvent and after the coating, the solution is imidized by a heat treatment at a high temperature. Thus, a heat treatment at from 250 to 350° C. is necessary and this causes a problem such as rupture of the dielectric layer on the surface of anode foil due to the heat.

Polyimides used in the present invention are satisfactorily curable by a heat treatment at a low temperature of 200° C. or less, preferably from 100 to 200° C., and reduced in the external shocks such as rupture or breakage of the dielectric layer on the surface of anode foil.

The polyimides are a compound containing an imide structure in the main chain. Examples of the polyimides which can be preferably used in the present invention include the compounds represented by the following formulae (1) to (4) each having a flexible structure where intramolecular rotation readily takes place in the diamine component skeleton, and polyimides represented by the following formula (5) obtained by the polycondensation reaction of 3,3',4,4'-diphenylsulfonetetracarboxylic dianhydride with aromatic diamines. The polyimides preferably have an average molecular weight of from about 1,000 to about 1,000,000, more preferably from about 2,000 to about 200,000.

In the former case, the solution coated is thermally modified into a polymer and cured by a heat treatment at from 160 to 180° C., as a result, a flexible film having high heat resistance and good insulating property is formed. The polyimide film obtained maintains rubber-like properties

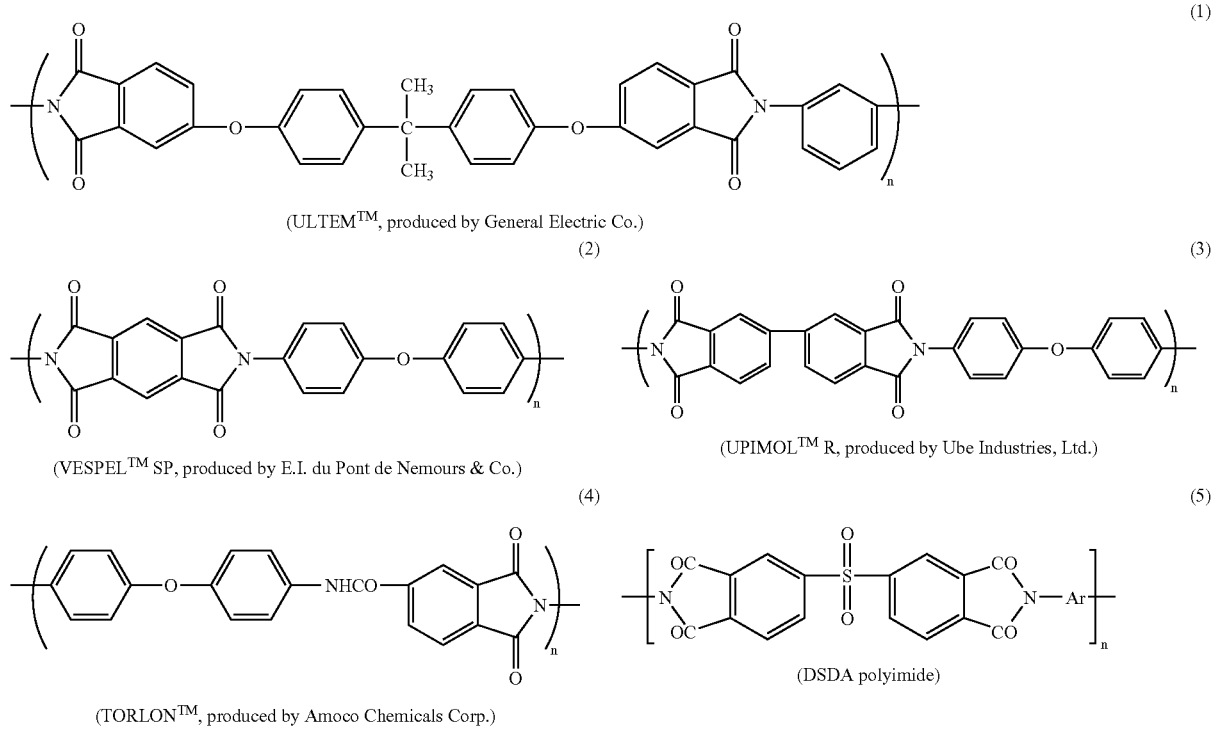

These compounds each can be dissolved or dispersed in organic solvents, therefore, a solution or dispersion having a solid concentration (in turn viscosity) suitable for the coating operation can be easily prepared. The concentration is preferably from about 10 to about 60 wt %, more preferably from about 15 to about 40 wt %. The viscosity is preferably from about 50 to about 30,000 cp, more preferably from about 500 to about 15,000 cp. If the concentration or viscosity is less than this range, the masking line may be blurred, whereas if the concentration or viscosity exceeds the range, cobwebbing or the like occurs and an unstable line width results.

After the coating of a masking material solution, the formed masking layer may be subjected to treatments such as drying, heating, irradiation with light and the like, if desired.

Specific examples of the polyimide solution which can be preferably used include a solution obtained by dissolving low molecular polyimides curable by a heat treatment after the coating, in a solvent reduced in the hygroscopicity such as 2-methoxyethyl ether and triethylene glycol dimethyl ether (the solution is commercially available, for example, under the trademark of "UPICOAT™ FS-100L" from Ube Industries, Ltd.), and a solution obtained by dissolving polyimide resins represented by formula (5) in NMP (N-methyl-2-pyrrolidone) or DMAc (dimethylacetamide) (the solution is commercially available, for example, under the trademark of "RIKACOAT™" from Shin Nippon Rika K. K.).

such that the tensile strength is 2.0 kg/mm$^2$, the elongation of cured film is 65% and the initial elastic modulus is 40.6 kg/mm$^2$, and at the same time exhibits high heat resistance such that the thermal decomposition temperature is 461° C. Furthermore, the volume resistivity is as high as 10$^{16}$ Ω·cm even under humidification and the dielectric constant is as low as 3.2, thus the polyimide film holds excellent electrical properties as the insulating film.

In the latter case, a film excellent in the heat resistance, mechanical properties, electrical properties and resistance against chemicals can be formed merely by removing the solvent at a temperature of 200° C. or less. The film obtained has a tensile strength of about 11.8 kg/mm$^2$, a cured film elongation of 14.2%, an initial elastic modulus of 274 kg/mm$^2$ or more and a heat resistance such that the temperature for weight reduction of 5% is 515° C. The volume resistivity is 10$^{16}$ Ω·cm and the dielectric constant is 3.1 (25° C.) or 2.8 (200° C.), thus, the film holds excellent electrical properties.

In the present invention, the masking material solution may contain a defoaming agent (e.g., lower alcohol type, mineral oil type, silicone resins type, oleic acid, polypropylene glycol), a thixotropy-imparting agent (e.g., silica fine powder, mica, talc, calcium carbonate) or a silicon agent for resin modification (e.g., silane coupling agent, silicone oil, silicon-based surfactant, silicone-based synthetic lubricant). For example, by adding a silicone oil (e.g., polysiloxane) and a silane coupling agent, improvements may be expected in the defoaming property (to prevent bubbling at curing), releasability (to prevent adhering of electrically conducting polymer), lubricity (permeability inside the pore part), electrical insulating property (to prevent leakage current), water repellency (to prevent climbing up of the solution at the polymerization of electrically conducting polymer), damping and vibration proofing property (to oppose pressure at the stacking of capacitor device), or heat resistance and weatherability of resin (introduction of crosslinking mechanism).

In the present invention, the above-described effects by virtue of addition of silicone oil (polysiloxane) may also be similarly obtained by using a composition comprising soluble polyimidesiloxane and epoxy resin (see, JP-A-8-253677 (U.S. Pat. No. 5,643,986)).

(Coating Method of Masking Material)

An apparatus for coating a masking agent to a solid electrolytic capacitor substrate (hereinafter referred to simply as "substrate") according to the present invention will next be described with reference to a plan view (FIG. 5A) and a side view (FIG. 5B) schematically showing an embodiment of the present invention.

Figure 5A:
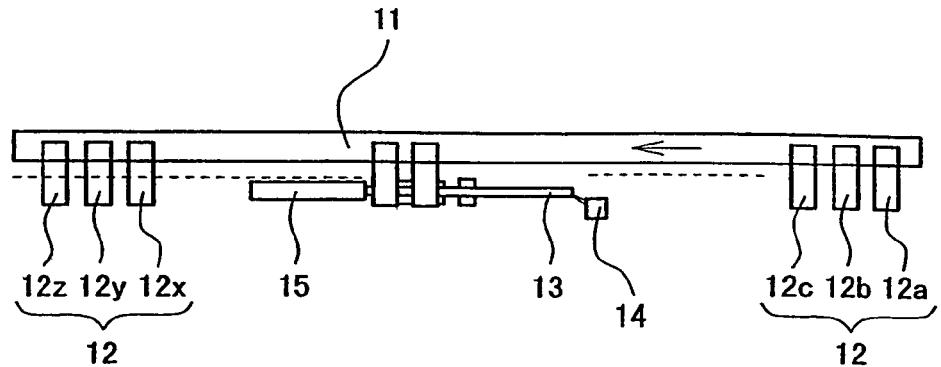
FIG. 5A is a plan view of an example of an apparatus for coating a masking material and FIG. 5B is a side view of the example of the apparatus.
Figure 5B:
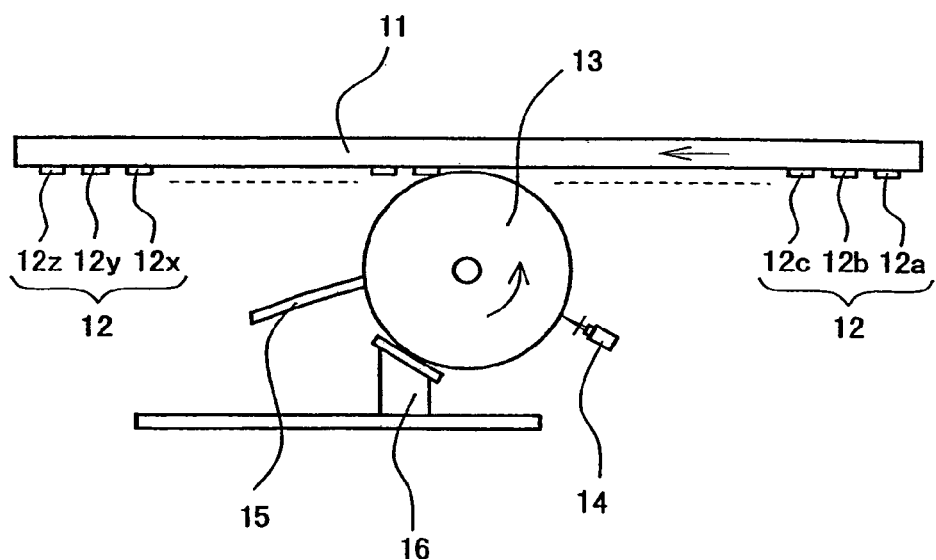

The apparatus of FIG. 5A is adapted to carry out, during one rotation of a disk (13), one cycle consisting of the steps of: feeding to the coating surface of the disk a solution which contains a masking material; coating the masking agent to a substrate; and cleaning off the remaining masking agent from the coating surface of the disk.

In FIG. 5 reference numeral 11 denotes a metallic guide to which a plurality of substrates (12a, 12b, 12c, . . . ) are fixedly attached in a cantilever fashion.

The substrates can be fixedly attached to the metallic guide (11) through electrical or mechanical bonding. Examples of a bonding method include soldering, bonding by use of an electrically conducting paste, ultrasonic welding, spot welding, and electron beam welding.

Figure 6A:
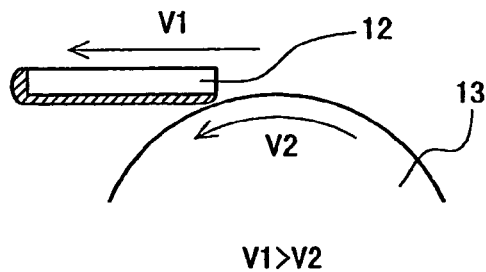
FIG. 6 is an explanatory view showing application of the masking material to side surfaces of the substrate.
Figure 6B:
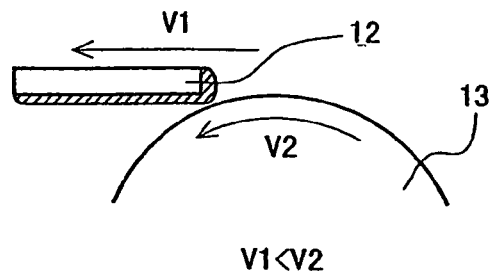

The metallic guide (11) moves linearly around over the rotating disk (13) in the direction of the arrow. Customarily used means, such as a motor, belt, or cylinder, may be used as means (not shown) for moving the metallic guide (11). Through adjustment of the relationship between the traveling speed (V1) of the metallic guide and the rotational speed (V2) of the rotating disk, the side surfaces of the substrate (12) can be coated with the masking agent. Specifically, as shown in FIG. 6A, when the traveling speed (V1) of the metallic guide is greater than the rotational speed (V2), the side surface of the substrate located forward with respect to the traveling direction can be coated with the masking agent. When the traveling speed (V1) of the metallic guide is smaller than the rotational speed (V2), the side surface of the substrate located backward with respect to the traveling direction can be coated with the masking agent (FIG. 6B).

The apparatus of the present invention also includes a mechanism for inverting the relative position between the metallic guide and the rotating disk, thereby coating the masking agent to opposite surfaces and opposite side surfaces of substrates fixedly attached to the metallic guide.

An example of such a mechanism is an inverting mechanism for use with the metallic guide. Inversion can be carried out by use of a motor or cylinder, or by rendering a holder of the metallic guide rotatable about the longitudinal direction of the metallic guide and turning the holder by half-turn.

In order to apply the masking agent to the reversal surfaces of the substrates fixedly attached to the inverted metallic guide, the relationship between the coating surface of the rotating disk and the coating position of the substrates must be adjusted. This adjustment can be performed by moving the metallic guide, moving the rotating disk, or moving both metallic guide and rotating disk by use of customarily used means.

Alternatively, two rotating disks may be employed. Either one of the two rotating disks is dedicated to coating of the masking agent to uncoated surfaces of the substrates fixedly attached to the inverted metallic guide.

Further, two rotating disks may be disposed on opposite sides with respect to the substrates fixedly attached to the metallic guide, thereby coating the masking agent concurrently to opposite surfaces and opposite side surfaces of the substrate.

The rotating disk (13) is a disk-shaped roll that has a smooth coating surface, which comes into contact with the substrate at a desired position at a predetermined pressing force.

The rotating disk (13) is formed of a hard material resistance to a solution which contains the masking material; specifically, a metal (stainless steel, for example) or a ceramic material. The size of the rotating disk (13) may be such that the masking agent does not degenerate during one rotation of the rotating disk (13) (during one cycle of coating of the masking agent). The size of the rotating disk (13) is usually about 2 mm to about 500 mm in diameter, but is not particularly limited in the present invention. The width of the coating surface of the rotating disk is selected so as to apply the masking agent by a desired width, and is preferably approximately 0.2 mm to 3.0 mm.

Around the rotating disk (13), there are disposed means (14) for feeding to the coating surface of the rotating disk a solution which contains the masking agent upstream of the position of contact between the rotating disk (13) (upstream with respect to the direction of rotation), and a scraper (15) and a wiping material (16) for cleaning the coating surface of the rotating disk downstream of the position of contact between the substrate (12).

The present embodiment employs, as the means (14) for feeding the solution which contains the masking material, a quantity coating-fluid feeder equipped with a closed continuous quantity dispenser of little pulsation. The quantity coating-fluid feeder feeds the solution which contains the masking material, to the coating surface of the rotating disk continuously at a predetermined flow rate through a resin tube resistant to the solution and by means of a discharge needle.

In order to stably feed to the coating surface of the disk (13) the solution which contains the masking material, there is provided a fine regulating mechanism for stabilizing the distance between the tip of the needle and the disk surface. An example of such a mechanism is a micrometer head (screw mechanism) adapted to adjust a vertical position finely.

The coating surface of the rotating disk (13) fed with the solution which contains the masking material comes into contact with the substrate at a constant pressing force at the position of contact with the substrate. The pressing force is determined so as not to exceed the elastic limit of the substrate and preferably such that the deflection of the rotating disk as measured at the smooth top (coating surface) falls within a range of from about 0.03 mm to about 0.3 mm. A specific pressing force depends on the type and thickness of the substrate, but may be set to, for example, about 0.002 g to about 0.02 g per substrate (3 mm (width)×0.1 mm (thickness)).

Next, the coating surface of the disk is cleaned. For example, the mechanical scraper (15) and the wiping material (16) are used as cleaning means.

The scraper (15) is the form of a blade which is formed of stainless steel or ceramic material as in the case of the disk or formed of a material (for example, resin or steel) softer than the material of the disk. The scraper (15) is disposed such that at least a tip comes into close contact with the coating surface of the disk so as to scrape off a remained masking agent from the coating surface of the disk. The wiping material (16) is disposed downstream of the scraper (15) (downstream with respect to the direction of rotation) and includes resin fiber soaked with an organic solvent and/or water (for example, a solvent identical to that used in the masking material solution). The wiping material (16) is adapted to wipe off adhering substances from the coating surface of the disk, thereby preparing for the next coating cycle.

Since the apparatus of the present invention employs a nonpulsating drive system for feeding the solution which contains the masking material, from the closed container to the coating surface of the rotating disk, the solution can be fed stably.

(Solid Electrolyte)

In the present invention, the solid electrolyte is preferably an electrically conducting polymer containing as a repeating unit a divalent group of any one of pyrrole, thiophene, furan and aniline structures, or any substituted derivative thereof. However, those conventionally known as the material for the solid electrolyte may be used without any particular limitation.

For example, a method of coating a 3,4-ethylenedioxythiophene monomer and an oxidizing agent each preferably in the form of a solution separately one after another or simultaneously on the oxide film of metal foil (see, JP-A-2-15611 (U.S. Pat. No. 4,910,645) and JP-A-10-32145 (EP 820076 (A2))) may be used.

In general, arylsulfonate-type dopants are used in the electrically conducting polymer. Examples of the salt which can be used include salts of benzenesulfonic acid, toluenesulfonic acid, naphthalenesulfonic acid, anthracene-sulfonic acid and anthraquinonesulfonic acid.

BEST MODE FOR CARRYING OUT THE INVENTION

The present invention is described below by referring to Examples, however, the present invention should not be construed as being limited to the following Examples.

EXAMPLE 1

Masking Step

A 100 μm-thick formed aluminum foil cut (slit) into a width of 3 mm was cut into strips each having a length of 13 mm. One short side part of a foil strip was fixed to a metal-made guide by welding. A polyimide resin solution (UPICOAT™ FS-100L, produced by Ube Industries, Ltd.) adjusted to a viscosity of 800 cp was supplied to a disk-like coating apparatus having a 0.4 mm-width coating surface and while press-contacting the coating surface of the coating apparatus onto the aluminum formed foil, a 0.8 mm-width line was drawn by the solution on the portion 7 mm inside from the unfixed end. The solution was then dried at about 180° C. to form a masking layer (polyimide film).

Electrochemical Forming Step

The aluminum foil fixed to a metal-made guide was disengaged from the coating apparatus. Thereafter, the area from the distal end to the masking line of the aluminum foil was dipped in an aqueous ammonium adipate solution and a voltage of 13 V was applied to electrochemically form the unformed area on the cut end portion. Thus, a dielectric film was formed.

Solid Electrolyte Forming Step

In the electrochemically formed layer region, a solid electrolyte was formed as follows.

More specifically, the area (3 mm×4 mm) opposite to the part of masking layer formed 4 mm inside from the distal end of aluminum foil was dipped in an isopropanol solution containing 20 wt % of 3,4-ethylenedioxythiohene (Solution 1), pulled up and left standing at 25° C. for 5 minutes. Thereafter, the aluminum foil area treated with the monomer solution was dipped in an aqueous solution containing 30 wt % of aqueous ammonium sulfate solution (Solution 2) and then dried at 60° C. for 10 minutes to allow oxidative polymerization to proceed. The operation from dipping in Solution 1 to oxidative polymerization by dipping in Solution 2 was repeated 25 times to form a solid electrolyte layer.

Fabrication and Test of Chip-Type Solid Electrolytic Capacitor Device

Figure 7:
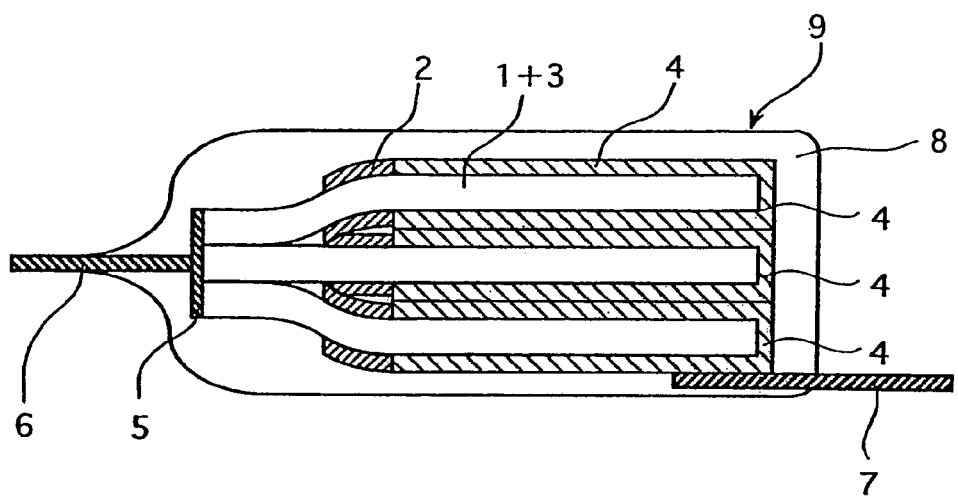
FIG. 7 is a cross section of the solid electrolytic device manufactured in Examples.

Three sheets of cut foil in the moiety having the masking layer were superposed by joining one on another with silver paste, an anode lead terminal was welded to the portion free of the electrically conducting polymer, the whole was moulded with epoxy resin, and the device obtained was aged at 120° C. for 2 hours while applying a rated voltage. In this manner, 30 units in total of chip-type solid electrolytic capacitors were manufactured. FIG. 7 shows a cross section of the thus-manufactured chip-type solid electrolytic capacitor.

These capacitor devices were subjected to a reflow soldering test by passing each device through a temperature zone at 230° C. for 30 seconds. The leakage current 1 minute after the application of a rated voltage was measured and an average leakage current of devices having a measured value of 1 CV or less was determined. When the leakage current was 0.04 CV or more, the device was determined as defective. The results obtained are shown in Table 1.

Structural Analysis of the Masking Portion of Capacitor

Figure 1D:
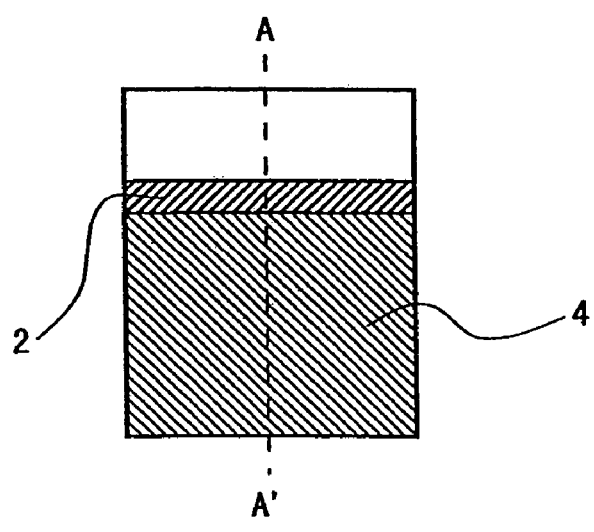
Figure 8:
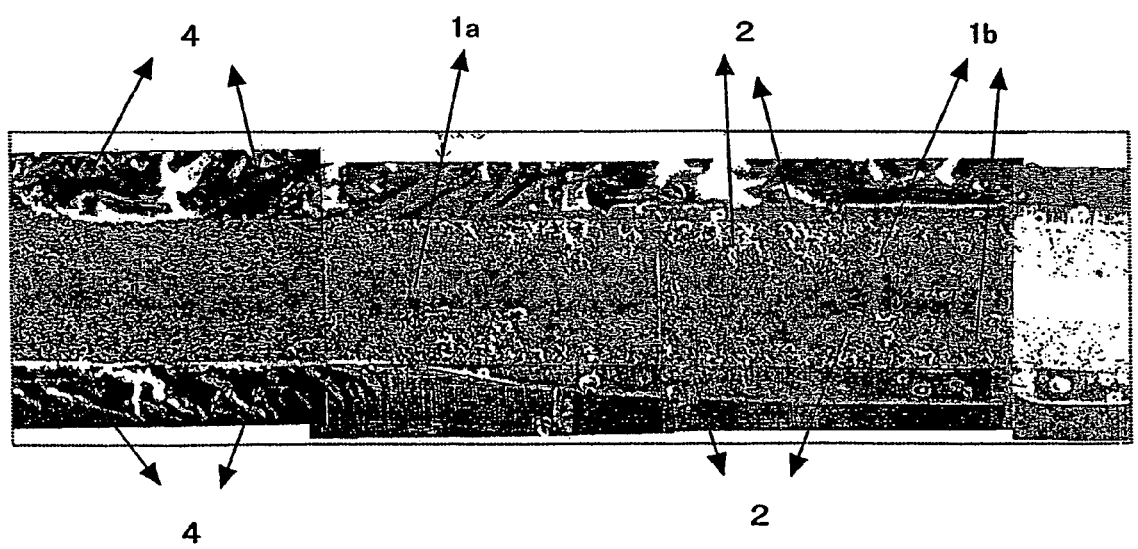
FIG. 8 is an enlarged photograph showing a peripheral portion of the masking portion of a capacitor coated with the masking material.

In the solid electrolyte forming step of Example 1, aluminum foil was used as the metal material and a sulfur-containing polymer layer (a polymer of 3,4-ethylenedioxythiphene) was used as a solid electrolyte layer. Thus produced capacitor material (specimen) was put in an epoxy resin (trade name: Quetol-812) and the resin was cured by heating at 30 to 60° C. for 20 to 30 hours to fix the specimen. Then, it was cut along A–A' in FIG. 1D. FIG. 8 is a photograph (magnification: ×500) of the peripheral area of the masking portion.

Cutting was performed by means of a microtome along A–A' and the cut surface was observed for the two-dimensional distribution of a specific element by a mapping method using an electron probe microanalyser (EPMA), which is an apparatus for analysing the composition of elements contained in a minute volume (on the order of 1 $\mu m^3$). Use of the above electron probe microanalyser allows quantitative analysis of elements from 1 up to several wt percents (%) per unit volume ($\mu m^3$).

In the enlarged photograph, an aluminum core metal (1a), dielectric film layer (1b), a solid electrolyte (sulfur-containing polymer layer) (4), and a masking layer (2) are observed.

Figure 2:
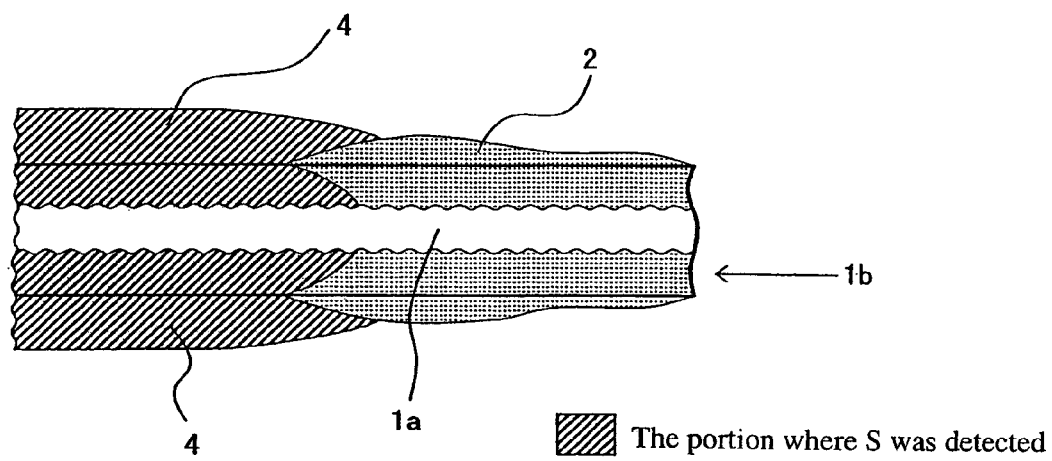
FIG. 2 is a schematic diagram showing the structure of a masking layer of a solid electrolytic capacitor obtained by the method of the present invention.
Figure 3:
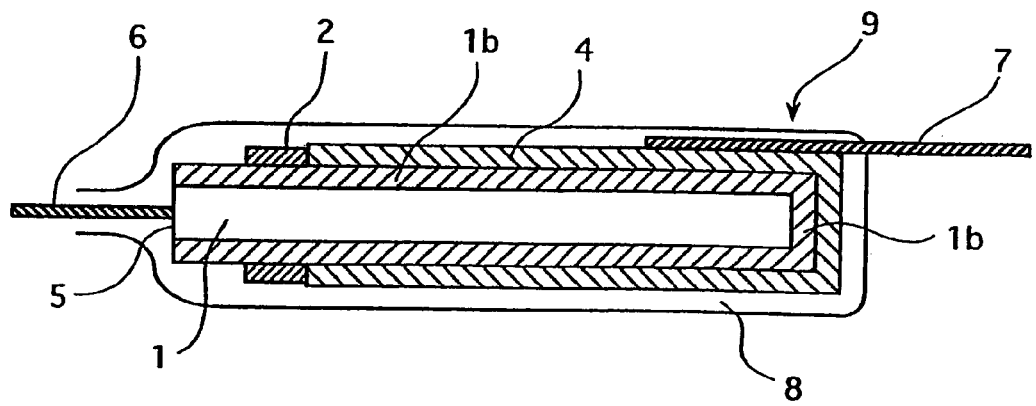
FIG. 3 is a cross section of an example of the solid electrolytic capacitor device.
Figure 4A:
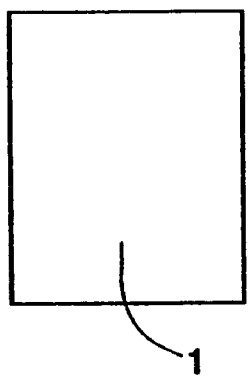
FIGS. 4A to 4F each is a view showing the outline of the production process of a solid electrolytic capacitor when two-stage masking treatment is performed.
Figure 4B:
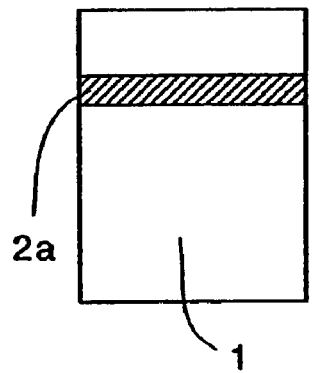
Figure 4C:
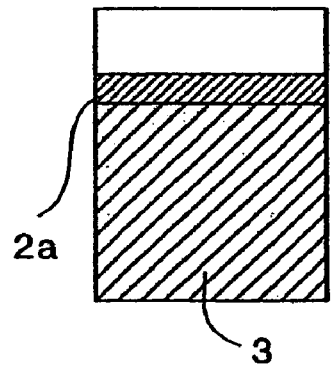
Figure 4D:
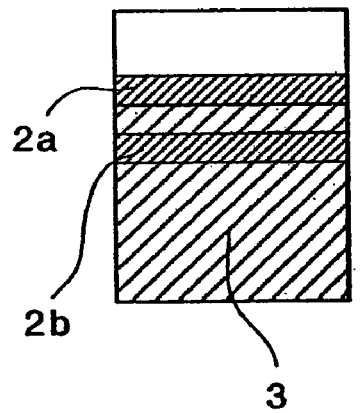
Figure 4E:
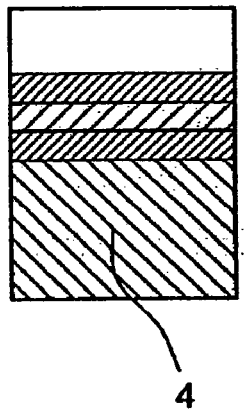
Figure 4F:
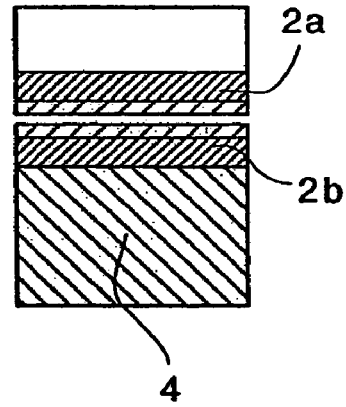

(1a) and (1b) contain aluminum element, (4) contains sulfur element, and (4) and (2) contain carbon element. Therefore, elemental analysis of carbon, sulfur, aluminum, etc. gave a clear distribution of masking material and polymer for each of the sites (1a), (1b), (4), and (2). FIG. 2 schematically illustrates how they distributed.

Observation of the distribution of detected sulfur elements (S) clearly indicated isolation of the area where the electrolyte (4) distributed in the dielectric layer (1b), which demonstrated that the masking material blocks the infiltration of the solid electrolyte. The term "blocking the infiltration as used herein means that there exists no more than 5 wt % of the solid electrolyte material is present in the area where the masking agent has infiltrated." This value can be obtained, for example, from a detection limit value for an element for identification of the electron probe microanalyser and the content of the element for identification in the solid electrolyte.

From the above results, the reason why formation of a capacitor device by the solid electrolytic capacitor of the present invention gives rise to capacitor characteristics improved in leakage current, capacitance, etc. is that the capacitor has a structure such that the masking agent infiltrates into the dielectric film and forms a masking material on the infiltrated portion of the dielectric film while the solid electrolyte cannot infiltrate into the dielectric film where the masking agent has infiltrated and thus is completely blocked by the masking material formed on the infiltrated portion of the dielectric film.

EXAMPLE 2

Chip-type solid electrolytic capacitors were manufactured in the same manner as in Example 1 except for using a polyimide resin solution (RIKACOAT™, produced by Shin Nippon Rika K. K.) as the masking material. The measurement of leakage current and the reflow soldering test were also performed in the same manner. The results obtained are shown in Table 1.

EXAMPLE 3

Chip-type solid electrolytic capacitors were manufactured in the same manner as in Example 1 except that the oxidative polymerization in the step of forming a solid electrolyte was performed by dipping the aluminum foil in an aqueous solution prepared by further adding sodium 2-anthraquinonesulfonate (produced by Tokyo Chemical Industry Co.) to Solution 2 to have a concentration of 0.07 wt %. The measurement of leakage current and the reflow soldering test were also performed in the same manner. The results obtained are shown in Table 1.

EXAMPLE 4

Chip-type solid electrolytic capacitors were manufactured in the same manner as in Example 1 except that the oxidative polymerization in the step of forming a solid electrolyte was performed by dipping the aluminum foil in an aqueous solution prepared by further adding sodium 2-naphthalenesulfonate (produced by Tokyo Chemical Industry Co.) to Solution 2 to have a concentration of 0.06 wt %. The measurement of leakage current and the reflow soldering test were also performed in the same manner. The results obtained are shown in Table 1.

EXAMPLE 5

Chip-type solid electrolytic capacitors were manufactured in the same manner as in Example 3 except that N-methylpyrrole was used instead of 3,4-ethylenedioxythiophene. The measurement of leakage current and the reflow soldering test were also performed in the same manner. The results obtained are shown in Table 1.

COMPARATIVE EXAMPLE 1

Chip-type solid electrolytic capacitors were manufactured in the same manner as in Example 1 except that a tape comprising a heat resistant substrate and a heat resistant adhesive was bonded in the width of 1 mm to the front and back surfaces of the aluminum foil in place of forming the masking layer. The measurement of leakage current and the reflow soldering test were performed in the same manner. The results obtained are shown in Table 1. Also, analysis of sulfur element using EPMA was performed in the same manner as in Example 1. The results indicated that in the dielectric layer (1b), the area where the solid electrolyte layer (4) distributed did not separate clearly but the solid electrolyte infiltrated into the masking layer.

COMPARATIVE EXAMPLE 2

Chip-type solid electrolytic capacitors were manufactured in the same manner as in Example 1 except that a 0.8 mm-width line was drawn on the front and back surfaces of the foil by coating and curing phenol resin in place of forming a polymer insulating film. The measurement of leakage current and the reflow soldering test were performed in the same manner. The results obtained are shown in Table 1. Also, analysis of EPMA was performed in the same manner as in Comparative Example 1. The results indicated that the solid electrolyte infiltrated into the masking layer.

TABLE 1

|  | Average Leakage Current | Heat Resistance Failure Ratio in Reflow Soldering Test |
| --- | --- | --- |
| Example 1 | 0.19 μA | 0/30 |
| Example 2 | 0.20 μA | 0/30 |
| Example 3 | 0.17 μA | 0/30 |
| Example 4 | 0.16 μA | 0/30 |
| Example 5 | 0.18 μA | 0/30 |
| Comparative Example 1 | 2.0 μA | 4/30 |
| Comparative Example 2 | 2.2 μA | 5/30 |

EXAMPLE 6

First Masking Step

A 100 μm-thick formed aluminum foil cut (slit) into a width of 3 mm was cut into strips each having a length of 13 mm. One short side part of a foil strip was fixed to a metal-made guide by welding. A polyimide resin solution (RIKACOAT™, trademark, produced by Shin Nippon Rika K. K.) adjusted to a viscosity of 800 cp was supplied to a disk-like coating apparatus having a 0.4 mm-width coating surface and while press-contacting the coating surface of the coating apparatus onto the aluminum formed foil, a 0.8 mm-width line was drawn by the solution on the portion 7 mm inside from the unfixed end. The solution was then dried at about 180° C. to form a first masking layer (polyimide film).

Electrochemical Forming Step

The aluminum foil fixed to a metal-made guide was disengaged from the coating apparatus. Thereafter, the area from the distal end to the first masking line of the aluminum foil was dipped in an aqueous ammonium adipate solution and a voltage of 13 V was applied to electrochemically form the unformed area on the cut end portion. Thus, a dielectric film was formed.

Second Masking Step

The aluminum foil fixed to a metal-made guide was again mounted on the coating apparatus and a 0.8 mm-width line was drawn by the polyimide resin solution (RIKACOAT™, trademark, produced by Shin Nippon Rika K. K.) on the portion 4 mm inside from the unfixed distal end in the same manner as above. The solution was dried at about 180° C. to form a second masking layer (polyimide film).

Solid Electrolyte Forming Step

In the electrochemically formed layer region exclusive of the space between the first masking layer and the second masking layer, a solid electrolyte was formed as follows.

More specifically, the area (3 mm×4 mm) opposite to the first masking layer side with respect to the second masking layer formed 4 mm inside from the distal end of aluminum foil was dipped in an isopropanol solution containing 20 wt % of 3,4-ethylenedioxythiophene (Solution 1), pulled up and left standing at 25° C. for 5 minutes. Thereafter, the aluminum foil area treated with the monomer solution was dipped in an aqueous solution containing 30 wt % of aqueous ammonium persulfate solution (Solution 2) and then dried at 60° C. for 10 minutes to allow oxidative polymerization to proceed. The operation from dipping in Solution 1 to oxidative polymerization by dipping in Solution 2 was repeated 25 times to form a solid electrolyte layer.

Cutting Step

The thus-prepared aluminum foil element having formed thereon a solid electrolyte layer was subjected to coating of carbon paste and silver paste in the area where the electrically conducting polymer layer was formed, thereafter, the aluminum foil was cut off between the first masking layer and the second masking layer.

Fabrication and Test of Chip-Type Solid Electrolytic Capacitor Device

Three sheets of cut foil in the moiety having the second masking layer were superposed by joining one on another with silver paste, an anode lead terminal was welded to the portion free of the electrically conducting polymer, the whole was sealed with epoxy resin, and the device obtained was aged at 120° C. for 2 hours while applying a rated voltage. In this manner, 30 units in total of chip-type solid electrolytic capacitors were manufactured. FIG. 7 shows a cross section of the thus-manufactured chip-type solid electrolytic capacitor.

These capacitor devices were subjected to a reflow soldering test by passing each device through a temperature zone at 230° C. for 30 seconds. The leakage current 1 minute after the application of a rated voltage was measured and an average leakage current of devices having a measured value of 1 CV or less were determined. When the leakage current was 0.04 CV or more, the device was determined as defective. The results obtained are shown in Table 2.

EXAMPLE 7

Chip-type solid electrolytic capacitors were manufactured in the same manner as in Example 6 except for using a polyimide resin solution (UPICOAT™ FS-100L, produced by Ube Industries, Ltd.) as the first masking material. The measurement of leakage current and the reflow soldering test were also performed in the same manner. The results obtained are shown in Table 2.

EXAMPLE 8

Chip-type solid electrolytic capacitors were manufactured in the same manner as in Example 6 except for using a polyimide resin solution (UPICOAT™ FS-100L, produced by Ube Industries, Ltd.) as the first and second masking materials. The measurement of leakage current and the reflow soldering test were also performed in the same manner. The results obtained are shown in Table 2.

EXAMPLE 9

Chip-type solid electrolytic capacitors were manufactured in the same manner as in Example 8 except that the oxidative polymerization in the step of forming a solid electrolyte was performed by dipping the aluminum foil in an aqueous solution prepared by further adding sodium 2-anthraquinonesulfonate (produced by Tokyo Chemical Industry Co.) to Solution 2 to have a concentration of 0.07 wt %. The measurement of leakage current and the reflow soldering test were also performed in the same manner. The results obtained are shown in Table 2.

EXAMPLE 10

Chip-type solid electrolytic capacitors were manufactured in the same manner as in Example 8 except that the oxidative polymerization in the step of forming a solid electrolyte was performed by dipping the aluminum foil in an aqueous solution prepared by further adding sodium 2-naphthalenesulfonate (produced by Tokyo Chemical Industry Co.) to Solution 2 to have a concentration of 0.06 wt %. The measurement of leakage current and the reflow soldering test were also performed in the same manner. The results obtained are shown in Table 2.

COMPARATIVE EXAMPLE 3

Chip-type solid electrolytic capacitors were manufactured in the same manner as in Example 6 except that masking was performed once. More specifically, the chip-type solid electrolytic capacitor was manufactured by forming a polymer (polyimide) film only through the second masking step (masking at the site of 4 mm inside from the distal end of the aluminum foil) and then subjecting the aluminum foil to electrochemical forming, formation of solid electrolyte and cutting off. The measurement of leakage current and the reflow soldering test were performed in the same manner. The results obtained are shown in Table 2.

COMPARATIVE EXAMPLE 4

Chip-type solid electrolytic capacitors were manufactured in the same manner as in Comparative Example 3 except that a tape comprising a heat resistant substrate and a heat resistant adhesive was bonded in the width of 1 mm to the front and back surfaces of the aluminum foil in place of forming the second masking layer. The measurement of leakage current and the reflow soldering test were performed in the same manner. The results obtained are shown in Table 2.

COMPARATIVE EXAMPLE 5

Chip-type solid electrolytic capacitors were manufactured in the same manner as in Comparative Example 3 except that a 0.8 mm-width line was drawn on the front and back surfaces of the foil by coating and curing phenol resin in place of forming a polymer insulating film. The measurement of leakage current and the reflow soldering test were performed in the same manner. The results obtained are shown in Table 2.

TABLE 2

|  | Average Leakage Current | Heat Resistance Failure Ratio in Reflow Soldering Test |
|---|---|---|
| Example 6 | 0.20 µA | 0/30 |
| Example 7 | 0.19 µA | 0/30 |
| Example 8 | 0.17 µA | 0/30 |
| Example 9 | 0.16 µA | 0/30 |
| Example 10 | 0.16 µA | 0/30 |
| Comparative Example 3 | 0.32 µA | 1/30 |
| Comparative Example 4 | 2.0 µA | 4/30 |
| Comparative Example 5 | 2.2 µA | 5/30 |

INDUSTRIAL APPLICABILITY

The method for producing a solid electrolytic capacitor of the present invention is advantageous in the following points as compared with conventional techniques.

(a) By use of polyimide resins as a masking material in place of conventionally used tape or epoxy or phenol-type resins, the surface of the dielectric film is covered sufficiently and further the masking agent infiltrates into the dielectric film to the core metal, resulting in that the electrically conducting polymer-impregnated part and the anode part can be completely separated, the leakage current can be in turn reduced, and the stress generated at the reflow treatment or the like during or after the formation of a capacitor device can be relaxed.

(b) Since the cut end part of the formed foil in the moiety is electrochemically formed in a perfect manner, the increase of leakage current due to invasion of electrically conducting polymer or electrically conducting paste into the cut end part can be prevented.

(c) By virtue of the masking layer, the electrochemically forming solution is prevented from running out over the masking at the subsequent electrochemically forming step and a necessary area is electrochemically formed with ease and no fail. Further, since the solid electrolytic capacitor of the invention has the structure such that the masking agent infiltrates into the above dielectric film and the masking material is formed on the infiltrated portion, thereby preventing the solid electrolyte from infiltrating into the dielectric film in which the masking agent has already infiltrated, the cathode portion and the anode portion can be reliably insulated from each other.

(d) The polyimide film used as a masking material has resistance against water-based solvents or organic solvents such as alcohols, used at the polymerization of the electrically conducting polymer, therefore, the insulation between the anode part and the cathode part can be maintained without fail.

Further, according to the method that performs masking twice, the first masking layer (temporary masking layer) prevents the electrochemically forming solution from running out over the masking in the subsequent electrochemically forming step so that a necessary area (area exclusive of the anode part of the solid electrolytic capacitor) is electrochemically formed with ease and without fail. More specifically, if the temporary masking is not present, the electrochemically forming solution may run out over the substrate and the leakage current at the electrochemical forming becomes large to cause short circuit to the electrode. The occurrence of short circuit may be reduced by taking a space between the position of electrochemically forming solution and the position of electrode using a long substrate (metal foil), however, decrease in the profitability and the productivity results. In the case of not providing a temporary masking, the amount of the electrochemically forming solution run out is difficult to control and the electrochemically formed state cannot be controlled. According to the two-stage masking method of the present invention, these problems can be solved.

Furthermore, in the method and the apparatus according to the present invention for coating a masking agent to a solid electrolytic capacitor substrate, the masking material (for example, a polyimide resin) which is dissolved or dispersed uniformly in a solvent can be applied to the substrate continuously in the form of a straight line having a stable width each time the disk makes one rotation.

The invention claimed is:

1. A method for coating a masking agent, comprising the steps of fixedly attaching a plurality of solid electrolytic capacitor substrates to a metallic guide in a cantilever fashion, and bringing a rotating disk into contact with the substrates at a desired position at a predetermined pressing force while the metallic guide is moved, thereby coating a masking material solution, which is fed from masking material solution supply means to the coating surface of the rotating disk, to opposite surfaces and opposite side surfaces of the solid electrolytic capacitor substrate at a desired position.

2. The method for coating a masking agent as claimed in claim 1, wherein the relative position between the metallic guide and the rotating disk is inverted to thereby apply the masking material solution to opposite surfaces and opposite side surfaces of the substrate fixedly attached to the metallic guide.

* * * * *